United States Patent Office 2,838,506
Patented June 10, 1958

2,838,506

NEW ALKYL-AMINOALKYL-COMPOUNDS AND PROCESS FOR THEIR MANUFACTURE

Karl Hoffmann and Ernst Urech, Binningen, Switzerland, assignors to Ciba Pharmaceutical Products Inc., Summit, N. J.

No Drawing. Application July 10, 1956
Serial No. 596,827

Claims priority, application Switzerland July 19, 1955

5 Claims. (Cl. 260—243)

This invention relates to the manufacture of phenothiazines of the formula

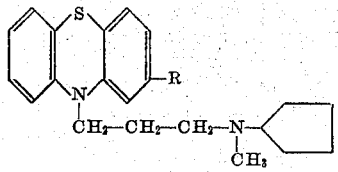

wherein R represents hydrogen or chlorine, and also of their salts with acids which are suitable for forming therapeutically useful salts.

These compounds show a number of characteristic inhibitory effects on the central nervous system together with different, specific antagonistic or spasmolytic effects and a prolonged reduction in blood pressure, and are useful as hypotensive agents and central nervous system inhibitors.

The aforementioned effects depend to a high degree on the structure of the said phenothiazines, and the slightest alterations in the molecular arrangement diminish the above effects or make them disappear. Thus, for example, compounds of the above formula in which the cyclopentyl radical is replaced by a cyclohexyl radical, show a ten times weaker inhibitory effect on the central nervous system and slight to no spasmolysis.

The new phenothiazines and their salts can be prepared in accordance with any one of several methods which are known in themselves, for example, a γ-(cyclopentyl-methyl-amino)-propyl radical can be introduced into a corresponding N-unsubstituted phenothiazine by reaction with a reactive ester of γ-(cyclopentyl-methyl-amino)-propanol and, if desired, the compound obtained may be converted into a salt thereof. Reactive esters are, those of strong inorganic or organic acids, for example, hydrohalic acids, such as hydrochloric acid, or organic sulfonic acids, such as para-toluene sulfonic acid. The reaction is advantageously carried out in the presence of a condensing agent capable of neutralizing the acid formed such as sodamide.

An alternative process consists, for example, in reacting a reactive ester of a corresponding 10-(γ-oxypropyl)-phenothiazine with cyclopentyl-methyl-amine.

Alternatively, a Schiff's base obtained by reacting a corresponding 10-(γ-aminopropyl)-phenothiazine with cyclopentanone may be converted by means of a reducing agent into a 10-[γ-(N-cyclopentylamino)-propyl]-phenothiazine and the compound obtained can be methylated according to known methods. The reduction of the Schiff's base which is advantageously carried out simultaneously with the condensation of the 10-(γ-amino-propyl)-phenothiazine with cyclopentanone can be accomplished with hydrogen in the presence of a catalyst, for example, Raney nickel.

Depending on the procedure used, the new compounds are obtained in the form of their bases or their salts. From the salts the free amine bases can be made by known methods. From the bases there can be obtained salts by reaction with acids which are suitable for forming therapeutically useful salts, for example, hydrohalic acids, sulfuric acid, nitric acid, phosphoric acid, thiocyanic acid, acetic acid, propionic acid, oxalic acid, malonic acid, succinic acid, malic acid, methane sulfonic acid, ethane sulfonic acid, benzene sulfonic acid or toluene sulfonic acid or therapeutically active acids.

The starting materials are known or can be made by known methods. The invention also includes any modification of the process in which there is used as starting material an intermediate product obtainable at any stage of the process, and the remaining steps of the process are carried out.

The new compounds are useful as medicaments, for example in the form of pharmaceutical preparations which contain the new compounds or a salt thereof in admixture with a pharmaceutical organic or inorganic, solid or liquid carrier suitable for enteral, parenteral or topical administration. For making the carrier there are used substances which do not react with the new compounds, for example, water gelatine, lactose, starches, magnesium stearate, talc, vegetable oils, benzyl alcohols, gums, polyalkylene glycols, petroleum jelly, cholesterol or other known carriers for medicaments. The pharmaceutical preparations may be made up, for example, in the form of tablets, dragees, salves, creams or in liquid form as solutions, suspensions or emulsions. If desired, they may be sterilized and/or may contain auxiliary substances such as preserving agents, stabilizing agents, wetting or emulsifying agents, or salts for adjusting the osmotic pressure or buffers. They may also contain other therapeutically useful substances. The preparations are made up by the usual methods.

The following examples illusrate the invention:

Example 1

34.7 parts of 3-chlorophenothiazine are heated with 7.6 grams of sodamide in 400 cc. of dioxane until the evolution of ammonia subsides and then 34.0 grams of N-cyclophentyl-N-methyl-γ-aminopropyl chloride dissolved in 60 cc. of dioxane are slowly added in the course of one hour. The mixture is then boiled for 1½ hours, cooled, and the excess of sodamide is decomposed with alcohol. The solvent is distilled off in vacuo, and the residue is taken up in ether and water. The ethereal solution is washed with water, dried and the solvent is evaporated. The residual oil is distilled in vacuo, whereby 10-[γ-(N-cyclopentyl-N-methyl-amino)-propyl]-3-chlorophenothiazine of the formula

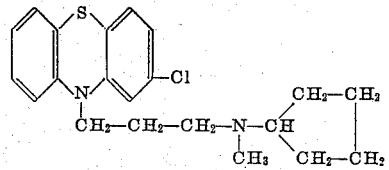

is obtained in the form of a yellowish oil boiling at 200–210° C. under 0.2 mm. pressure.

The hydrochloride is obtained in the form of a colorless water-soluble crystalline powder melting at 136–139° C. (with decomposition) by mixing an ethereal solution of the base with the calculated quantity of alcoholic hydrochloric acid.

Instead of dioxane, another inert solvent may be used, such as benzene, toluene or xylene. Instead of the chloride of N-cyclopentyl-N-methyl-γ-aminopropanol, another reactive ester of this amino-alcohol may be used, for example, the bromide, the iodide or the benzene sulfonate or paratoluene sulfonate. Instead of sodamide, another acid-binding agent may be used, such as potas-

Example 2

A mixture of 43.5 grams of 10-(γ-aminopropyl)-3-chlorophenothiazine, 13.8 grams of cyclopentanone and 200 cc. of ethanol is hydrogenated in an autoclave at 70–100° C. under 6–10 atmospheres (gauge pressure) of hydrogen in the presence of a nickel catalyst. After the reaction the catalyst is filtered off with suction, the solvent is evaporated, and the residue is distilled. At 202–212° C. under 0.15 mm. pressure 10-[γ-(N-cyclopentyl)-aminopropyl]-3-chloropheno-thiazine of the formula

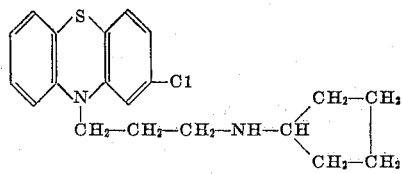

is obtained in the form of a pale yellow oil. 10-[γ-(N-cyclopentyl)-aminopropyl]-3-chlorophenothiazine can be methylated as follows:

A mixture of 35.8 grams of the base, 30.0 grams of formic acid of 85 percent strength and 23 cc. of formaldehyde solution of 40 percent strength by volume is heated under reflux for 6 hours at the boil. After being cooled, the mixture is poured into water, mixed with concentrated alkali, and the precipitated base is taken up in ether. After washing the ethereal solution with water and drying it over potassium carbonate, the solvent is evaporated and the residue is distilled, during which 10-[γ-(N-cyclopentyl-N-methyl)-aminopropyl]-3-chlorophenothiazine passes over at 195–205° C. under 0.18 mm. pressure. It is identical with the base described in Example 1.

Example 3

39.8 grams of phenothiazine are heated with 9.5 grams of sodamide in 200 cc. of dioxane until the evolution of ammonia subsides. 40.0 grams of N-cyclopentyl-N-methyl-γ-aminopropyl chloride dissolved in 80 cc. of dioxane are then added slowly in the course of one hour. The mixture is boiled for 1½ hours, cooled, and the excess of sodamide decomposed with alcohol. The solvent is distilled off in vacuo and the residue taken up in ether and water. The ethereal solution is washed with water, dried and the solvent is evaporated. The residual oil is distilled in vacuo, 10-[γ-(N-cyclopentyl-N-methylamino)-propyl]-phenothiazine of the formula

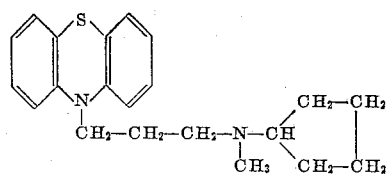

being obtained in the form of a yellowish oil boiling at 185–195° C. under 0.20 mm. of pressure.

The hydrochloride is obtained in the form of a colorless, water-soluble crystalline powder melting at 160–162° C. by mixing a solution of the base in methyl-ethyl ketone with the calculated quantity of alcoholic hydrochloric acid.

The condensation can also be carried out without using an acid-binding agent; for example, N-cyclopentyl-N-methyl-γ-aminopropyl chloride can be added dropwise to molten phenothiazine while stirring at 170°–180° C.

Example 4

A mixture of 27.5 grams of 10-(γ-chloropropyl)-phenothiazine, 25 grams of N-methyl-N-cyclopentylamine and 250 cc. of benzene is heated for 5 hours at 80–120° C. in a pressure vessel. The reaction mass is then mixed with aqueous alkali, the benzene solution is separated off and washed with water. After drying the benzene layer over potash, the solvent and any excess N-methyl-N-cyclopentylamine are distilled off. On distilling the residue in vacuo there is obtained 10-[γ-(N-cyclopentyl-N-methylamino)-propyl]-phenothiazine boiling at 180–190° C. under 0.15 mm. of pressure in the form of a pale yellow oil which is identical with the compound of Example 3.

Example 5

A mixture of 31.0 grams of 10-(γ-chloropropyl)-3-chlorophenothiazine, 25.0 grams of N-methyl-N-cyclopentylamine and 250 cc. of benzene is heated for 5 hours at 80–120° C. in a pressure vessel. The reaction mass is then mixed with aqueous alkali, the benzene solution separated off and washed with water. After drying the benzene layer over potash, the solvent and any excess N-methyl-N-cyclopentylamine are distilled off. On distilling the residue in vacuo there is obtained 10-[γ-(N-cyclopentyl - N - methylamino) - propyl] - 3 - chlorophenothiazine boiling at 181° C. under 0.04 mm. of pressure which is identical with the compound of Example 1.

Example 6

A mixture of 51.2 grams of 10-(γ-amino-propyl)-phenothiazine, 18.5 grams of cyclopentanone and 400 cc. of ethanol is hydrogenated in an autoclave at 70–100° C. under about 10 atmospheres (gauge pressure) of hydrogen in the presence of a nickel catalyst. After the reaction, the catalyst is filtered with suction, the solvent is evaporated, and the residue is distilled. At boiling point 180–190° C. under 0.20 mm. of pressure 10-[γ-(N-cyclopentyl)-aminopropyl]-phenothiazine of the formula

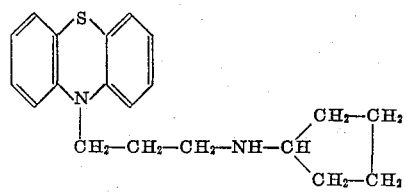

is obtained in the form of a pale yellow oil. It can be methylated as follows:

A mixture of 32.4 grams of the base, 30.0 grams of formic acid of 85 percent strength and 25 cc. of formaldehyde solution of 40 percent strength by volume is heated under reflux for 6 hours at the boil. The reaction mass is then concentrated in vacuo at 100° C., the residue is mixed with a little water, then with concentrated alkali and the precipitated base is taken up in ether. After washing the ethereal solution with water and drying it over potassium carbonate, the solvent is evaporated and the residue distilled, 10-[γ-(N-cyclopentyl-N-methylamino)-propyl]-phenothiazine passing over at 180–190° C. under 0.15 mm. of pressure in the form of a pale yellow oil. It is identical with the base of Example 3.

What is claimed is:

1. A compound selected from the group consisting of those having the general formula:

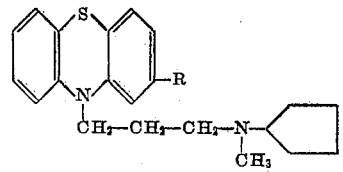

wherein R is a member of the group consisting of hydrogen and chlorine atoms, and the therapeutically useful acid addition salts thereof.

2. The new compound 10-[γ-(N-cyclopentyl-N-methylamino)-propyl]-phenothiazine.

3. The therapeutically useful acid addition salts of 10-[γ - (N - cyclopentyl - N - methylamino) - propyl]-phenothiazine.

4. The new compound 10-[γ-(N-cyclopentyl-N-methylamino)-propyl]-3-chlorophenothiazine.

5. The therapeutically useful acid addition salts of 10-[γ - (N - cyclopentyl - N - methylamino) - propyl] - 3-chlorophenothiazine.

References Cited in the file of this patent

UNITED STATES PATENTS

| | | |
|---|---|---|
| 2,590,125 | Robinson | Mar. 25, 1952 |
| 2,645,640 | Charpentier | July 14, 1953 |

OTHER REFERENCES

Astra etc.: Swedish Patent 134,622, Nov. 22, 1951 (2 pages).